July 5, 1955
L. M. CHESHIRE
2,712,148
WINDSHIELD WIPER
Filed March 6, 1953
2 Sheets-Sheet 1
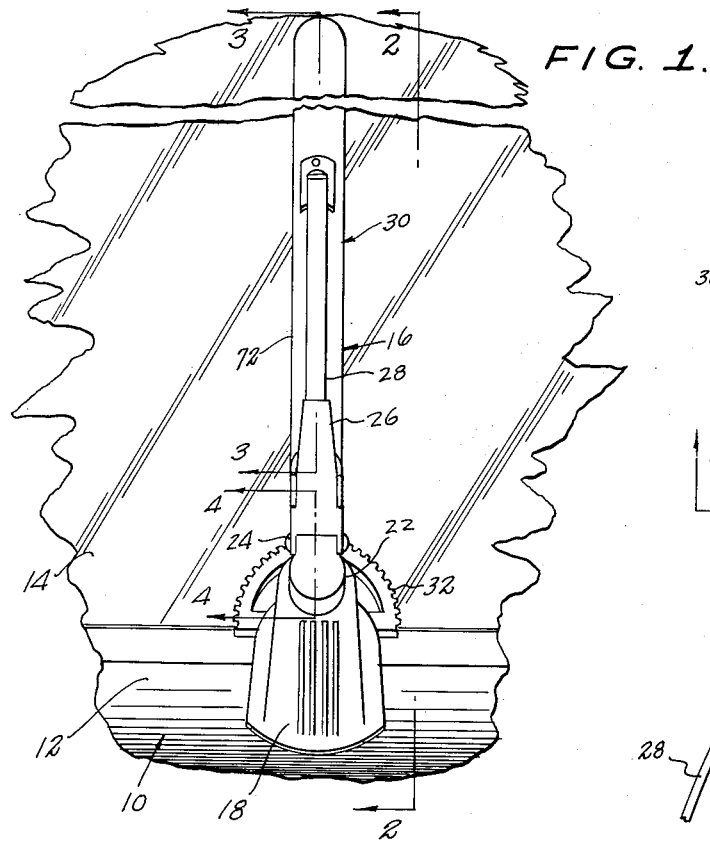
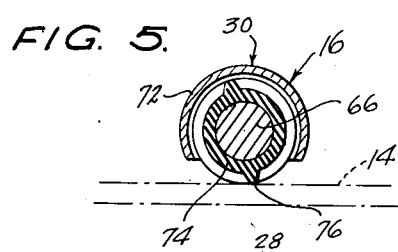
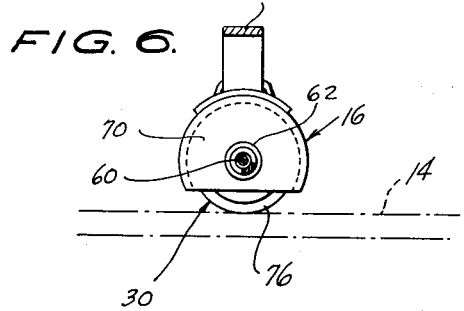
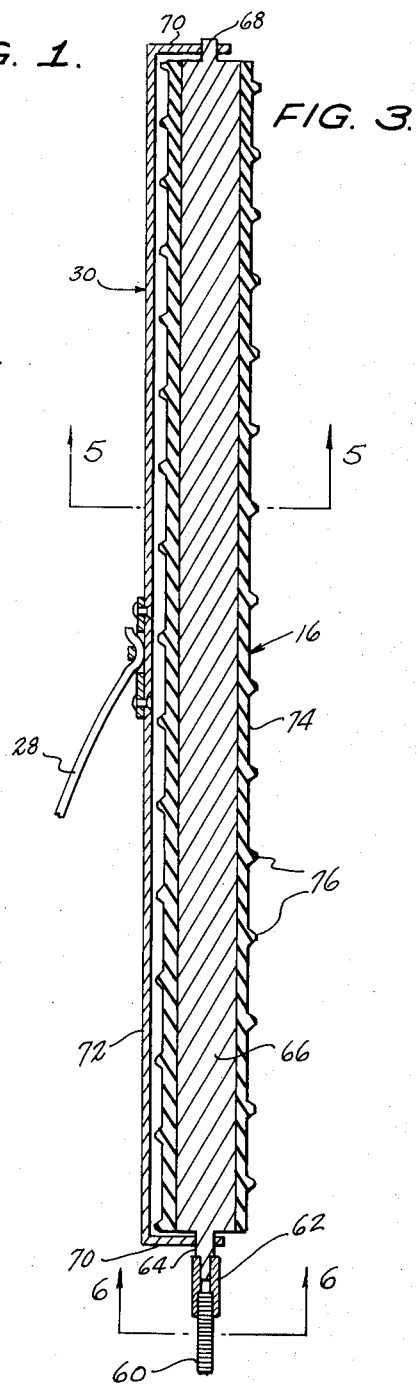
INVENTOR.
LUCIUS M. CHESHIRE,
BY
McMorrow, Berman & Davidson
ATTORNEYS.

July 5, 1955  L. M. CHESHIRE  2,712,148
WINDSHIELD WIPER

Filed March 6, 1953  2 Sheets-Sheet 2

INVENTOR.
LUCIUS M. CHESHIRE,
BY
McMorrow, Berman & Davidson
ATTORNEYS.

United States Patent Office 2,712,148
Patented July 5, 1955

2,712,148
WINDSHIELD WIPER
Lucius M. Cheshire, Hillsboro, N. C.

Application March 6, 1953, Serial No. 340,765

3 Claims. (Cl. 15—254)

This invention relates to a windshield wiper for automobiles or other vehicles. More particularly, the invention has reference to a wiper in which there is incorporated not only the conventional, oscillatory wiping action of windshield wipers in general use, but also a rotating, downwardly wiping action which increases measurably the efficiency of the wiper assembly.

It is well appreciated, I believe, by vehicle operators, that in many instances, a conventional windshield wiper having only an oscillatory or side to side wiping motion does not, in every instance, clean a windshield with desired efficiency. Often, and particularly on nicking or wearing of the blade element at some point along its length, streaks appear on the windshield during the operation of the wiper, and these tend to reduce visibility, and create hazardous driving conditions.

The main object of the present invention, accordingly, is to provide a windshield wiper assembly which will include a rotary blade element having spiralling, windshield-engaging rib means formed thereon, which means will not only wipe the windshield from side to side during the conventional oscillating motion of the wiper, but will also wipe downwardly over the windshield surface at a predetermined, relatively rapid rate. In this manner, I propose to increase distinctly the wiping efficiency of the mechanism, eliminating streaks and removing water, snow, and grime swiftly and easily.

Another object of importance is to provide a windshield wiper as stated which will be so designed as to prevent clogging of the windshield-engaging means.

Another object is to provide a wiper assembly as described wherein the oscillatory motion of the blade mount will be effective to cause, through the medium of suitable motion-translating devices, rotary motion of the blade element.

Yet another object is to provide a windshield wiper assembly as stated which can be mounted upon a vehicle without requiring substantial modification or redesign thereof, the assembly constituting the present invention being well adapted for connection to the conventional blade-oscillating means of a conventional windshield wiper.

Other objects will appear from the following description, the claims appended thereto, and from the annexed drawings, in which like reference characters designate like parts throughout the several views, and wherein:

Figure 1 is an elevational view of a windshield wiper formed in accordance with the present invention, as it appears when looking toward the windshield, the windshield and cowl of the vehicle being illustrated fragmentarily and in elevation;

Figure 3 is an enlarged longitudinal sectional view through the wiper assembly taken substantially on line 3—3 of Figure 1;

Figure 5 is a transverse sectional view on line 5—5 of Figure 3; and

Figure 6 is a transverse sectional view on line 6—6 of Figure 3.

Figure 2:
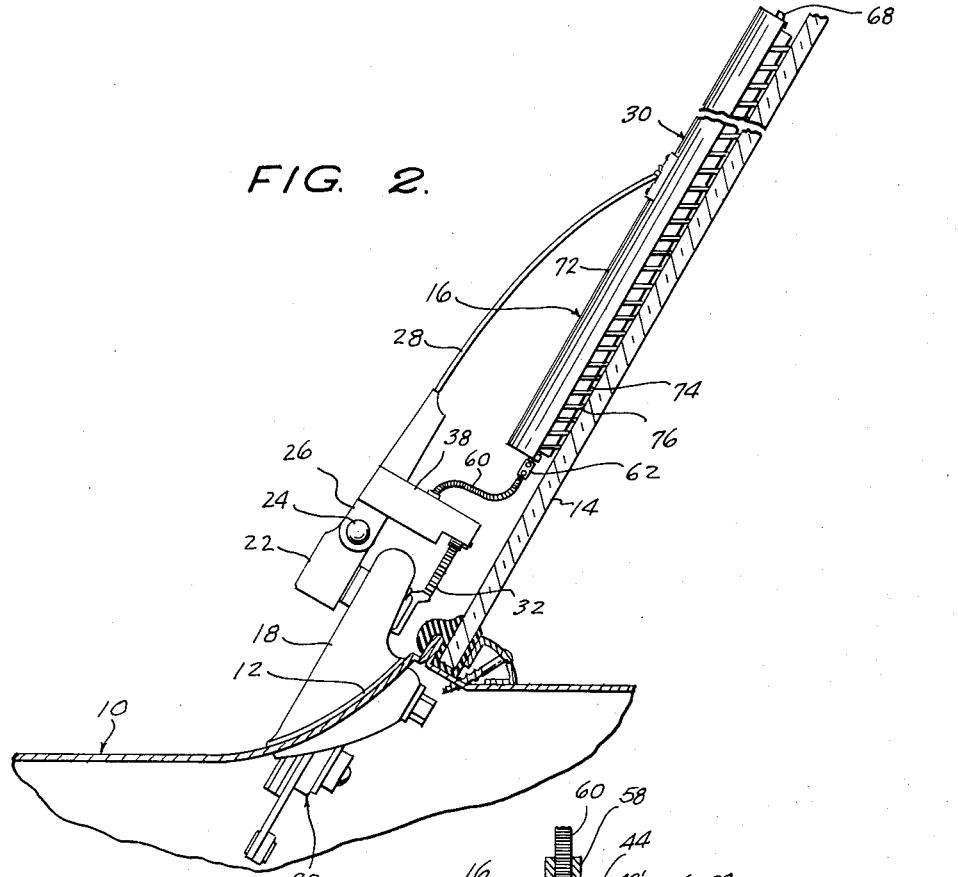
Figure 2 is a sectional view through the windshield and cowl taken substantially on line 2—2 of Figure 1, the wiping device constituting the present invention being illustrated in side elevation.

The reference numeral 10 has been applied generally in the drawings to designate a vehicle such as an automobile or truck. It will be understood, however, that the wiper assembly constituting the present invention can be readily mounted on other vehicles, such as airplanes, boats, etc.

In any event, the vehicle 10 is provided with the usual cowl 12 and windshield 14.

The device constituting the present invention has been designated generally at 16, and includes, at its lower or base end, a stationary main casing 18 into which extends the conventionally designed oscillating means 20. It will be understood that within the casing 18, the means 20 includes a driven shaft element, rotated continuously in opposite directions, said shaft element projecting out of the upper end portion of casing 18 and having fixed thereto a head 22.

All this is conventional per se, and hence has not been illustrated in detail. It may be noted that the oscillating means 20, in some vehicles, is electrically driven. In other vehicles, said means is driven by a vacuum motor operated from the engine of the vehicle.

In any event, the oscillating head 22 carries a transversely extending pin 24 journaled at its end in depending ears formed on the lower end of a channeled, relatively short, support arm 26. The connection causes the arm 26 to extend radially of the axis of oscillating motion of head 22, so as to normally swing back and forth in a plane parallel, or generally parallel, to that of the windshield 14. The pivotal connection 24 will, of course, permit the arm 26 to pivot about an axis normal to the axis of oscillating motion, thereby to permit use of the assembly on curved windshields, and also to permit use of said assembly in a manner that will allow the blade element to be pulled outwardly out of engagement from the windshield, when said windshield is to be manually washed or cleaned.

Fixedly connected to the upper end of the support arm 26, and constituting a longitudinal extension of said support arm, is a blade support member 28 of springable material, said member being tensioned in the direction of the windshield 14, so as to yieldably hold a blade assembly 30 in wiping engagement with said windshield. The blade support member 28, at its upper end, will have a pivotal connection to the blade assembly 30, whereby the blade assembly is pivoted relative to the member 28 about an axis extending transversely of said assembly and member. This further facilitates use of the invention on windshields that are curved, or are otherwise not wholly planiform.

Fixedly secured to the main casing 18, at the upper end of said main casing, is a stationary gear segment 32, said gear segment being spaced outwardly from the windshield 14, and being disposed in a plane approximately paralleling that of the windshield.

Figure 4:
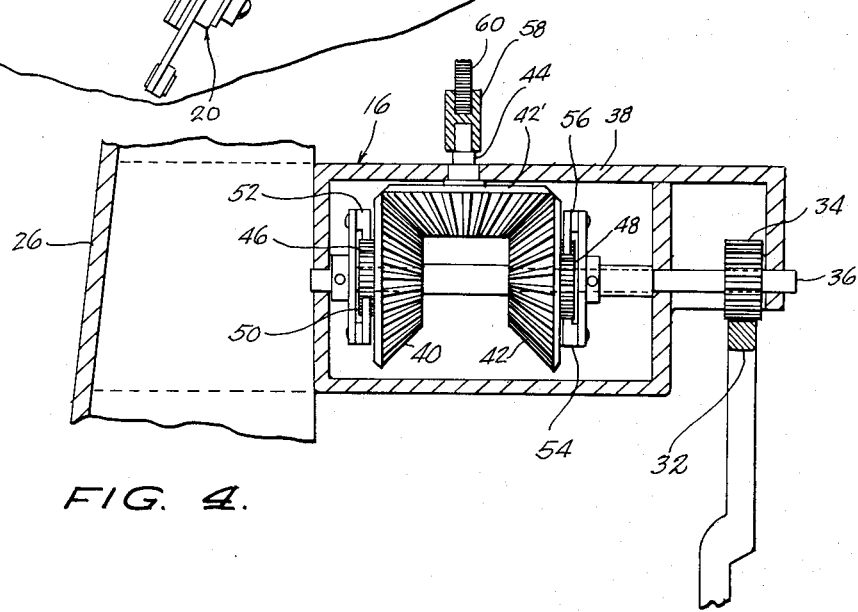
Figure 4 is an enlarged, fragmentary, longitudinal sectional view taken on line 4—4 of Figure 1 and showing the means whereby the oscillatory motion is converted to rotary motion of the blade element.

In mesh with the segment 32 is a gear 34 (Figure 4), said gear being secured to one end of a shaft 36, for rotating the shaft when the gear 34 is rotated by traversing the approximately semi-circular segment 32, from end to end of said segment.

Shaft 36 is journaled in a secondary casing 38, said casing 38 projecting laterally and inwardly from, and being fixedly secured at its outer end to, the support arm 26, at a location intermediate opposite ends of said support arm.

From the construction which has so far been described, it will be seen that on oscillation of the support arm 26, in the regular manner, the secondary casing 38 will be swung back and forth through an arcuate path therewith. The arc traversed by casing 38 and its shaft 36 is concentric with the toothed edge of segment 32, and accordingly, when the casing 38 is swung back and forth within its arcuate path of travel, the gear 34 and shaft 36 will be rotated first in one direction and then in an opposite direction.

Carried by the shaft 36 are spaced, oppositely arranged bevel gears 40, 42 respectively, said gears being rotatable relative to shaft 36. Gears 40, 42 are in mesh with a third bevel gear 42′ having a stub shaft 44 journaled in the top wall of casing 38, and projecting upwardly from the casing.

Affixed to the outer faces of gears 40, 42 are ratchet wheels 46, 48, said ratchet wheels being, as a result, rotatable relative to shaft 36. Oppositely arranged pawls 50, 52, rigid with shaft 36, are alternately engageable with ratchet wheel 46, and oppositely arranged pawls 54, 56 are similarly arranged relative to ratchet wheel 48, and are affixed to the shaft 36.

As a result, although shaft 36 is being continuously changed in respect to the direction of rotation, the third bevel gear 42′ will have substantially continuous rotary motion in one direction.

At this point, it may be noted that the motion-translating means comprised of gears 40, 42, 42′, and comprised further of the ratchet wheels 46, 48 and their associated pawls, is not, in and of itself, a novel mechanical movement. In its illustrated environment, however, that is, in the combination illustrated and described herein, it is thought to be new, and has not, to my knowledge, been heretofore used.

The upwardly projecting end of stub shaft 44 is secured to a sleeve-like coupling 58, and affixed to said coupling, so as to rotate with the coupling and with the stub shaft 44, is one end of a flexible shaft 60. The other end of the shaft 60 is secured to a coupling 62, said coupling 62 being affixed at its upper end (see Figure 3) to the depending lower trunnion 64 of an elongated core 66 of circular cross section having, at its upper end, a trunnion 68. Trunnions 64, 68 are journaled in bearing openings formed in the opposite end walls 70 of a channeled blade casing 72, to which the upper end of the support member 28 is pivotally attached.

Core 66 extends within and rotates a sleeve 74 of rubber or similar material, said sleeve 74 being integrally formed with spiralling wiping rib means 76. It will be understood, in this connection, that the number of turns per inch of the spiralled rib can be determined by experimentation or by application of suitable formulas, but should be such as will give the blade element defined by sleeve 74 and rib means 76 a distinct, downward wiping action, rather than a "rolling" action that might otherwise result if too few turns are given the rib means per inch of length of the blade element.

By reason of the construction illustrated and described, it will be seen that on normal operation of the oscillating means 20, the blade assembly 30 will be given a back and forth wiping motion across the windshield 14. This motion is, of course, the usual motion imparted to windshield wipers. However, in accordance with the invention, the oscillatory motion of the support arm 26 of the blade assembly is effective to cause the motion translating means shown in Figure 4 to go into effect, to impart, additionally, unidirectional, substantially continuous, rotary motion to the spiralled rib means of the blade assembly.

The end result achieved is the wiping of the windshield not only from side to side, but also downwardly, in a manner that will be effective in eliminating streaking of the windshield, and in producing, in a minimum of time, full and completely clear visibility.

The essential feature of the invention, it should be noted, is the blade itself, and although novelty may also reside in the combination wherein said blade is given, at one time, both oscillating and rotary motion, the blade, acting on the principle of a worm gear or helical feed screw, is in the final analysis the means that produces the continuous, downwardly wiping action on the windshield surface.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a windshield wiper, a stationary casing adapted to be mounted upon a vehicle adjacent a windshield of said vehicle; oscillating drive means in said casing; a blade assembly support arm mounted upon the casing and operatively connected to said means for oscillation of said arm through an arcuate path; a secondary casing affixed to said arm for oscillation through an arcuate path therewith; a gear segment rigidly secured to said stationary main casing; a stub shaft journaled in said secondary casing; motion-translating means in the secondary casing extending between the gear segment and said stub shaft, and arranged to impart substantially continuous, unidirectional, rotary movement to the stub shaft on oscillation of the secondary casing through its arcuate path, said second casing traversing the segment during its travel; a blade assembly carried by said arm to oscillate therewith; and a flexible shaft rotated by and extending from said stub shaft, said blade assembly including a rotary blade element having a spiralling rib formation thereon secured to the flexible shaft to rotate therewith and having wiping contact with the surface of the windshield.

2. In a windshield wiper, a stationary casing adapted to be mounted upon a vehicle adjacent a windshield of said vehicle; oscillating drive means in said casing; a blade assembly support arm mounted upon the casing and operatively connected to said means for oscillation of said arm through an arcuate path; a secondary casing affixed to said arm for oscillation through an arcuate path therewith; a gear segment rigidly secured to said stationary main casing; a stub shaft journaled in said secondary casing; motion-translating means in the secondary casing extending between the gear segment and said stub shaft, and arranged to impart substantially continuous, unidirectional, rotary movement to the stub shaft on oscillation of the secondary casing through its arcuate path, said second casing traversing the segment during its travel; a blade assembly carried by said arm to oscillate therewith; and a flexible shaft rotated by and extending from said stub shaft, said blade assembly including a rotary blade element having a spiralling rib formation thereon secured to the flexible shaft to rotate therewith and having wiping contact with the surface of the windshield, said blade assembly being pivotally connected intermediate its ends to the support arm.

3. In a windshield wiper, stationary casing means adapted to be mounted upon a vehicle; oscillating drive means in said casing means; a blade assembly support arm mounted upon the casing means and operatively connected to the drive means for oscillation of said arm in an arcuate path; a blade assembly connected to the support arm to oscillate therewith; a gear segment rigidly secured to said casing means; a rotary stub shaft mounted upon said casing means for oscillation with said support arm;

motion-translating means oscillating with the stub shaft and support arm and arranged to impart substantially continuous, unidirectional, rotary movement to the stub shaft on oscillation of the motion-translating means, said motion-translating means including a gear in mesh with said gear segment and traversing the segment during oscillating movement of the motion-translating means; and a flexible shaft rotated by and extending from said stub shaft, said blade assembly including a rotary blade element having a spiralling rib formation thereon secured to the flexible shaft to rotate therewith and having wiping contact with the surface of the windshield.

References Cited in the file of this patent

UNITED STATES PATENTS

| | | |
|---|---|---|
| 905,945 | Spoorendonk | Dec. 8, 1908 |
| 1,404,699 | Burger | Jan. 24, 1922 |
| 1,712,922 | Lindgren | May 14, 1929 |
| 1,739,896 | Garbell | Dec. 17, 1929 |
| 2,392,230 | Collins | Jan. 1, 1946 |
| 2,604,652 | Poindexter | July 29, 1952 |

FOREIGN PATENTS

| | | |
|---|---|---|
| 150,828 | Austria | Sept. 25, 1937 |